United States Patent
Hurd et al.

(10) Patent No.: US 8,316,071 B2
(45) Date of Patent: Nov. 20, 2012

(54) ARITHMETIC PROCESSING UNIT THAT PERFORMS MULTIPLY AND MULTIPLY-ADD OPERATIONS WITH SATURATION AND METHOD THEREFOR

(75) Inventors: Kevin A. Hurd, Fort Collins, CO (US); Scott A. Hilker, Campbell, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 826 days.

(21) Appl. No.: 12/472,715

(22) Filed: May 27, 2009

(65) Prior Publication Data

US 2010/0306301 A1    Dec. 2, 2010

(51) Int. Cl.
*G06F 7/38*    (2006.01)
*G06F 9/44*    (2006.01)

(52) U.S. Cl. ........ 708/491; 708/490; 708/495; 708/501; 708/523

(58) Field of Classification Search .................. 708/491, 708/490, 495, 501
See application file for complete search history.

(56) References Cited

U.S. PATENT DOCUMENTS

| | | | |
|---|---|---|---|
| 4,817,047 A | 3/1989 | Nishitani et al. | |
| 5,623,434 A | 4/1997 | Purcell | |
| 5,742,840 A | 4/1998 | Hansen et al. | |
| 6,223,198 B1 | 4/2001 | Oberman et al. | |
| 6,584,482 B1 | 6/2003 | Hansen et al. | |
| 7,428,566 B2 * | 9/2008 | Siu et al. | 708/501 |
| 7,716,266 B2 * | 5/2010 | Trong et al. | 708/501 |
| 7,870,182 B2 * | 1/2011 | Thendean et al. | 708/708 |
| 7,882,165 B2 * | 2/2011 | Simkins et al. | 708/490 |
| 2007/0174379 A1 | 7/2007 | Dockser et al. | |

FOREIGN PATENT DOCUMENTS

WO    2006059267 A2    6/2006

OTHER PUBLICATIONS

Balzola et al., "Design Alternatives for Parallel Maturating Multioperand Adders," pp. 1-6.*
Wikipedia article, "Saturation Arithmetic," printed from <http://en.wikipedia.org/wiki/Saturation_arithmetic> on May 27, 2009, 2 pages.
Pawasauskas, John, "CS563—Advanced Topics in Computer Graphics," MMX Technology, Apr. 22, 1997, printed from <http://web.cs.wpi.edu/~matt/courses/cs563/talks/powwie/p3/mmx.htm> on May 27, 2009, 11 pages.
Amd, "128-Bit SSE5 Instruction Set," AMD64 Technology, publication No. 43479, revision 3.01, Aug. 2007, printed from <http://www.amd.com/us-en/assets/content_type/white_papers_and_tech_docs/43479.pdf> on May 27, 2009, 254 pages.

(Continued)

*Primary Examiner* — Tammara Peyton

(57) ABSTRACT

Sum and carry signals are formed representing a product of a first and a second operand. A bias signal is formed having a value determined by a sign of a product of the first and the second operand. An output signal is provided based on an addition of the sum signal, the carry signal, a sign-extended addend, and the bias signal. A portion of the output signal, a saturated minimum value, or a saturated maximum value, is selected as a final result based on the sign of the product and a sign of the output signal.

19 Claims, 4 Drawing Sheets

OTHER PUBLICATIONS

Suzuki, H. et al., "1.047GHz, 1.2V, 90nm CMOS, 2-Way VLIW DSP Core Using Saturation Anticipator Circuit," 2006 Symposium on VLSI Circuits Digest of Technical Papers, 1-4244-0006-6/06, 2 pages.

Nadehara, K. et al., "Low-Power Multimedia RISC," IEEE Service Center, Los Alamitos, CA, Dec. 15, 1995, pp. 20-29.

Yadav, N. et al., "Parallel Saturating Fractional Arithmetic Units," Proceedings Great Lakes Symposium on VLSI, Mar. 4, 1999, pp. 214-217.

PCT/US2010/025900 International Search Report mailed Aug. 11, 2010, 4 pages.

* cited by examiner

US 8,316,071 B2

ARITHMETIC PROCESSING UNIT THAT PERFORMS MULTIPLY AND MULTIPLY-ADD OPERATIONS WITH SATURATION AND METHOD THEREFOR

FIELD OF THE DISCLOSURE

The present disclosure relates generally to data processing devices, and more particularly to arithmetic processing devices.

BACKGROUND

A data processing device may include a specialized arithmetic processing unit such as an integer or floating-point processing device. An arithmetic processing unit is particularly applicable for performing tasks associated with graphics processing, digital signal processing, and scientific applications. An arithmetic processing unit generally executes instructions wherein an instruction is associated with a particular mathematical computation. For example, an arithmetic processing unit may include instructions to perform arithmetic operations such as multiplication, addition, multiplication-addition, matrix computations, and the like. An arithmetic processing unit generally represents numbers using a binary floating-point format, a binary integer format, or both. Floating point numbers and integer numbers each have an associated precision and can represent a particular range of values determined by the number of binary bits used to represent the number. An arithmetic processing unit can use saturation arithmetic to represent a result of a mathematical operation that exceeds a supported range.

Saturation arithmetic is a version of arithmetic in which the result of an arithmetic operation is limited to a fixed range between a minimum and maximum value. Furthermore, if a result of an operation is greater than the maximum value, a condition known as an overflow condition, an arithmetic processing unit provides a result corresponding to the maximum representable value. If the result of an operation is less than the minimum value, a condition known as an underflow condition, the arithmetic processing unit provides a result corresponding to the minimum representable value. The use of saturation arithmetic can reduce the severity of an error that can occur when a calculation results in either an overflow or an underflow condition. For example, without the use of saturation, an arithmetic processing unit may provide a negative-value result when a calculation overflows a supported range. Unfortunately, detecting that saturation has occurred so that the arithmetic processing unit can provide a correct saturated result can adversely affect the computational performance of the unit. This is particularly true for a multiply-add operation where the size (number of binary bits used to represent a number) of a result is limited to the same size as the multiplicand, multiplier, or the addend.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. For clarity, an identical name denotes a signal, a node for conducting the signal, and the information represented by the signal.

DETAILED DESCRIPTION

Figure 1:
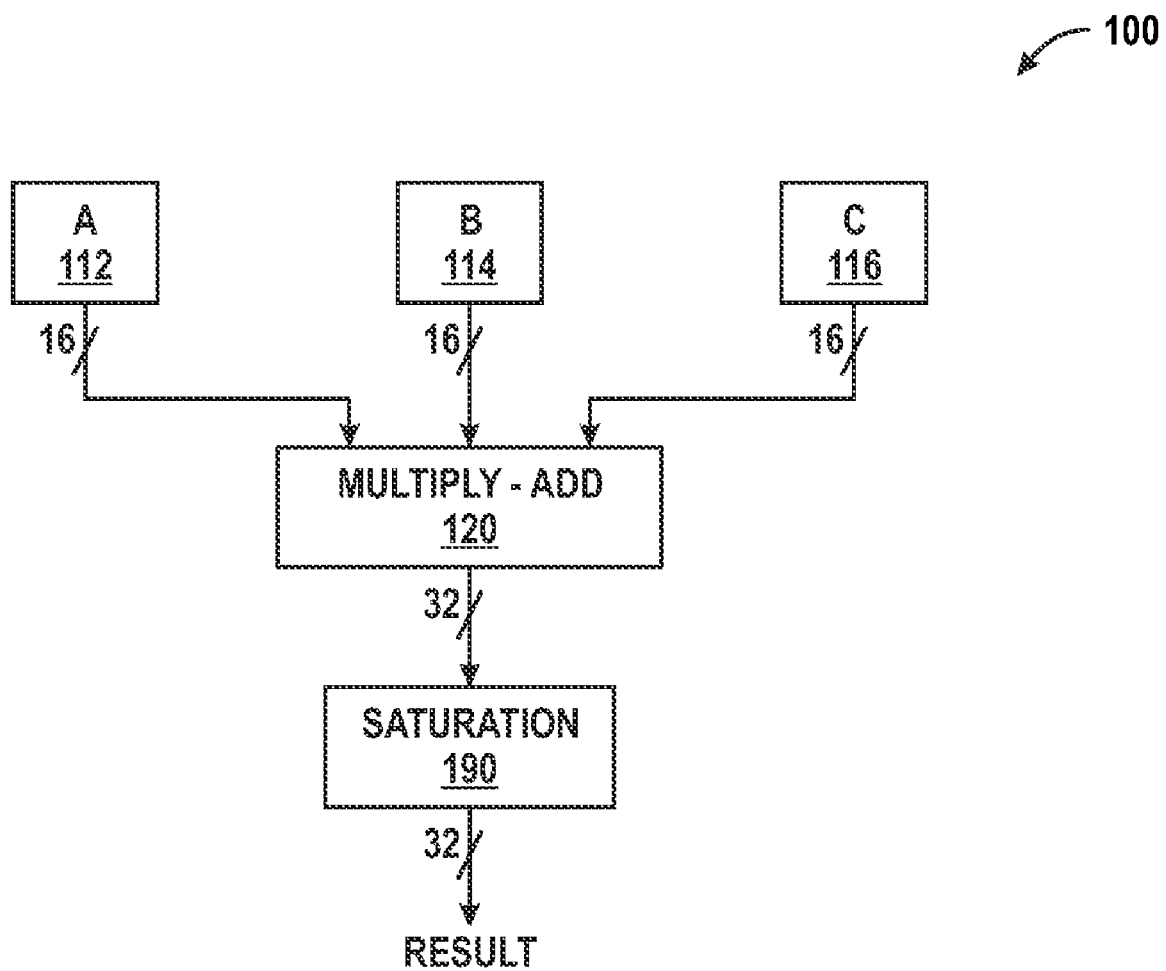
FIG. 1 is a block diagram illustrating a conventional arithmetic processing unit operable to perform saturation arithmetic as previously known.

FIG. 1 is a block diagram illustrating a conventional arithmetic processing unit 100 operable to perform saturation arithmetic as previously known. Arithmetic processing unit 100 performs a multiply-add calculation by multiplying two operands together to obtain a product, and adding the product to a third operand to provide an intermediate result. A saturation detection circuit receives the intermediate result and provides a final result of the calculation. Arithmetic processing unit 100 includes a multiplicand operand 112 labeled "A," a multiplier operand 114 labeled "B," an addend operand 116 labeled "C," a multiply-add module 120 to provide an intermediate result, and a saturation module 190 to provide a final result labeled "RESULT."

Multiply-add module 120 has a first input for receiving operand 112, a second input for receiving operand 114, a third input for receiving operand 116, and an output. Saturation module 190 has an input connected to the output of multiply-add module 120 and an output for providing signal RESULT. Arithmetic processing unit 100 can also perform a multiply-add operation by using a previously calculated multiply-add result as an addend in a subsequent multiply-add operation.

Arithmetic processing unit 100 receives operands A, B, and C, which are each sixteen-bit signed integers. An intermediate result provided by multiply-add module 120 includes additional bits to accurately represent the result of the multiply-add operation. In the present example illustrated at FIG. 1, the final result provided by saturation module 190 is a thirty-two bit signed integer. Saturation module 190 detects whether the value of the intermediate result provided by multiply-add module 120 exceeds that which can be represented by a thirty-two bit signed integer, a condition referred to as overflow or underflow. If overflow has occurred, saturation module 190 generates signal RESULT that represents a maximum positive thirty-two bit signed integer, binary 01111 . . . 1111. If underflow has occurred, saturation module 190 generates signal RESULT that represents a maximum negative thirty-two bit signed integer, binary 100 . . . 0000. If the intermediate result provided by multiply-add module 120 is within the supported range, saturation detection module 190 provides the intermediate result unchanged at its output.

Saturation module 190 determines whether an overflow or an underflow condition has occurred based on the respective sign of each operand and the sign of the intermediate result. If, however, representation of the final result is limited to a signed sixteen-bit integer, the operation of saturation module 190 is considerably more complex and time-consuming. Therefore, the computational performance of arithmetic processing unit 100 is impaired.

Overflow and underflow of a multiply-add operation is determined based on the final result of the operation. Therefore, performing a multiply-add with saturation is not mathematically equivalent to performing a multiplication operation with saturation followed by an addition operation with saturation. For example, a multiply operation may itself produce a product that exceeds a supported range, but the addition of an addend can return the final multiply-add result to a value that can be represented by the supported number of binary bits. There are four possible cases that characterize a multiply-add operation: 1) a product of a multiply operation exceeds the number of bits allotted to represent the result and the addition of an addend does not bring the final result back into a supported range; 2) a product of the multiply operation exceeds the number of bits allotted to represent the result, and the addition of an addend does bring the final result back into the supported range, 3) a product of the multiply operation does not exceed the number of bits allotted to represent the result, but the addition of an addend results in a value that does exceed the supported range; and 4) a product of the multiply operation does not exceed the number of bits allotted to represent the result, and the addition of an addend results in a value that does not exceed the supported range.

Figure 2:
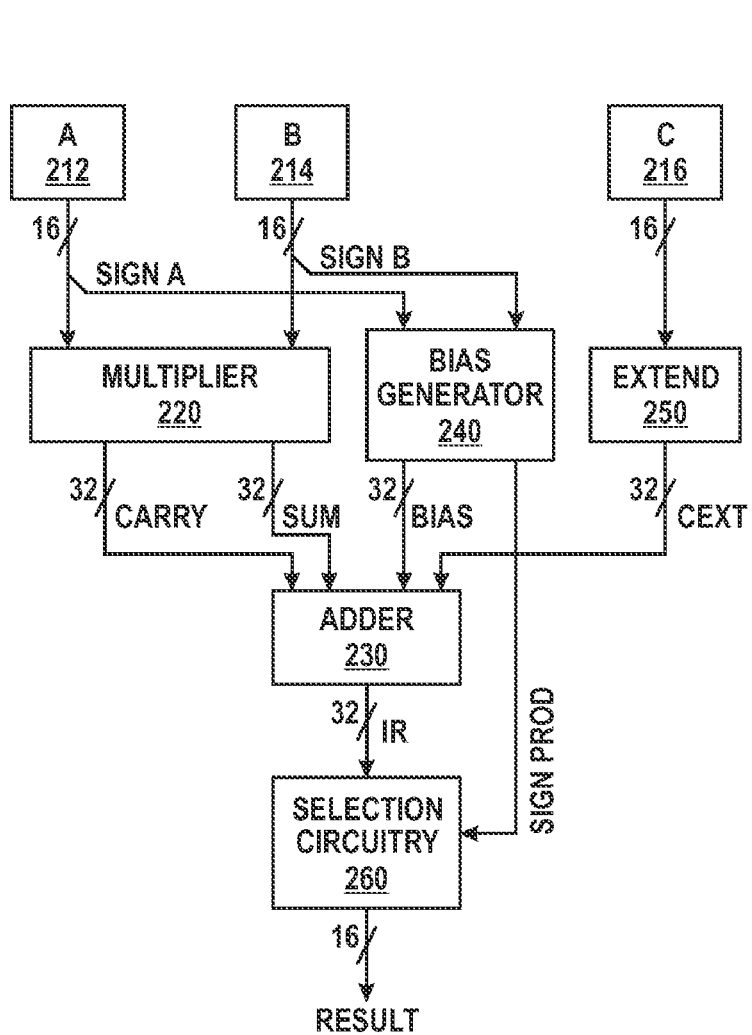
FIG. 2 is a block diagram illustrating an arithmetic processing unit operable to perform saturation arithmetic according to one embodiment of the present invention.

FIG. 2 is a block diagram illustrating an arithmetic processing unit 200 operable to perform saturation arithmetic according to one embodiment of the present invention. Arithmetic processing unit 200 performs a multiply-add operation and includes a bias generator for providing a bias value. The bias value, an intermediate product, and an addend operand are added together so that the complex and time consuming function performed by saturation module 190 of FIG. 1 is replaced by a simple multiplexing operation that can be performed quickly, without significantly delaying the result like arithmetic processing unit 100 of FIG. 1.

Arithmetic processing unit 200 includes a multiplicand operand 212 labeled "A," a multiplier operand 214 labeled "B," an addend operand 216 labeled "C," a multiplier 220, a bias generator 240, extend logic 250, an adder 230, and output selection circuitry 260.

Multiplier 220 has a first input for receiving operand 212, a second input for receiving operand 214, a first output for providing a signal labeled "CARRY," and a second output for providing a signal labeled "SUM." Bias generator 240 has a first input for receiving a signal labeled "SIGNA" corresponding to a sign of operand 212, a second input for receiving a signal labeled "SIGNB" corresponding to a sign of operand 214, an output for providing a signal labeled "BIAS," and an output for providing a signal representative of a sign of the product of operand 212 and operand 214 labeled "SIGN PROD." Extend logic 250 has a first input for receiving operand 216 and an output for providing a signal labeled "CEXT." Adder 230 has a first input for receiving signal CARRY, a second input for receiving signal SUM, a third input for receiving signal BIAS, a fourth input for receiving signal CEXT, and an output for providing an intermediate result labeled "IR." Selection circuitry 260 has a first input for receiving the intermediate result signal IR, a second input for receiving signal SIGN PROD, and an output for providing a final result labeled "RESULT."

Each of operands 212, 214, and 216 is a sixteen-bit signed integer. Multiplier 220 receives operand 212 and operand 214 and provides a product in the form of a thirty-two bit carry value represented by signal CARRY, and a thirty-two bit sum value represented by signal SUM.

Bias generator 240 provides a bias value represented by signal BIAS based on a sign of a product of multiplicand operand 212 and multiplier operand 214. The sign of the product is determined based on the sign of each operand, represented by signals SIGNA, and SIGNB. Signal BIAS includes thirty-two bits of information wherein the high-order seventeen bits are significant and the low-order fifteen bits are each zero. Extend logic 250 sign-extends addend operand 216 to provide a thirty-two bit signal CEXT, to correspond to the number of bits associated with each of signals SUM, CARRY, and BIAS.

Adder 230 adds the thirty-two bit bias value (signal BIAS), the thirty-two bit sign-extended addend (signal CEXT), and the two thirty-two bit multiply results (signal CARRY and signal SUM), and provides a thirty-two bit intermediate result represented by signal IR. In one embodiment, adder 230 includes one or more carry-save-adder (CSA) stages and a final carry-propagate adder (CPA). In another embodiment, CSA stages included at adder 230 can be shared with CSA stages included in multiplier 220. Thus, the thirty-two bit bias value and the sign-extended addend can be added (compressed) in one or more CSA stages included in multiplier 220. The bias value forces any result that would have exceeded the range associated with a sixteen-bit signed integer but that is within the range of a thirty-two bit signed integer, to provide an indication of an overflow or underflow of the thirty-two bit intermediate result represented by signal IR. Specifically, overflow or underflow of the sixteen-bit signed integer can be simply determined based on the sign of the thirty-two bit intermediate result and the sign of the product of operand 212 and 214.

Output selection circuitry 260 uses the sign of the product of operand 212 and operand 214 represented by signal SIGN PROD, and the sign of the intermediate result represented by the most significant bit of signal IR, to determine whether the multiply-add operation resulted in an overflow or an underflow condition. Because the intermediate result includes the addition of a bias value, output selection circuitry 260 can easily detect an overflow and underflow condition corresponding to a desired sixteen-bit result based on the thirty-two bit intermediate result. If the sign of the product of operand 212 and operand 214 is one (negative), and the sign of the intermediate result is zero (positive), an underflow has occurred and output selection circuitry 260 sets signal RESULT to a most-negative value representable using a sixteen-bit signed integer, binary 1000 0000 0000 0000. If the sign of the product of operand 212 and operand 214 is zero (positive), and the sign of the intermediate result is one (negative), an overflow has occurred and output selection circuitry 260 sets signal RESULT to a maximum representable positive sixteen-bit signed integer, binary 0111 1111 1111 1111. If neither an overflow nor an underflow has occurred, output selection circuitry 260 provides an output based on a portion of the intermediate result. In particular, when saturation has not occurred, the final result is equal to the low-order sixteen bits of the intermediate result represented by signal IR after inverting bit fifteen.

Figure 3:
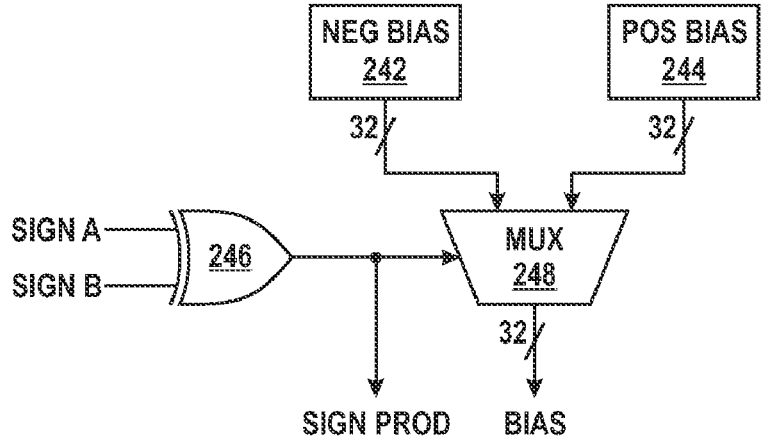
FIG. 3 is a partial schematic and partial block diagram illustrating the bias generator of FIG. 2.

FIG. 3 is a partial schematic and partial block diagram illustrating bias generator 240 of FIG. 2. Bias generator 240 includes a negative bias value 242, a positive bias value 244, an exclusive-NOR gate 246, and a multiplexer 248. Exclusive-NOR gate 246 has a first input for receiving signal SIGN A, a second input for receiving signal SIGN B, and an output for providing signal SIGN PROD. Multiplexer 248 has a first data input for receiving negative bias value 242, a second input for receiving positive bias vale 244, a control input for receiving signal SIGN PROD, and an output for providing signal BIAS.

If signal SIGN PROD is at a logic-high level (negative), multiplexer 248 selects negative bias value 242 and generates signal BIAS with a value of binary 1000 0000 0000 0000 1000 0000 0000 0000

If signal SIGN PROD is at a logic-low level (positive), multiplexer 248 selects positive bias value 244 and generates signal BIAS with a value of binary 0111 1111 1111 1111 1000 0000 0000 0000

Figure 4:
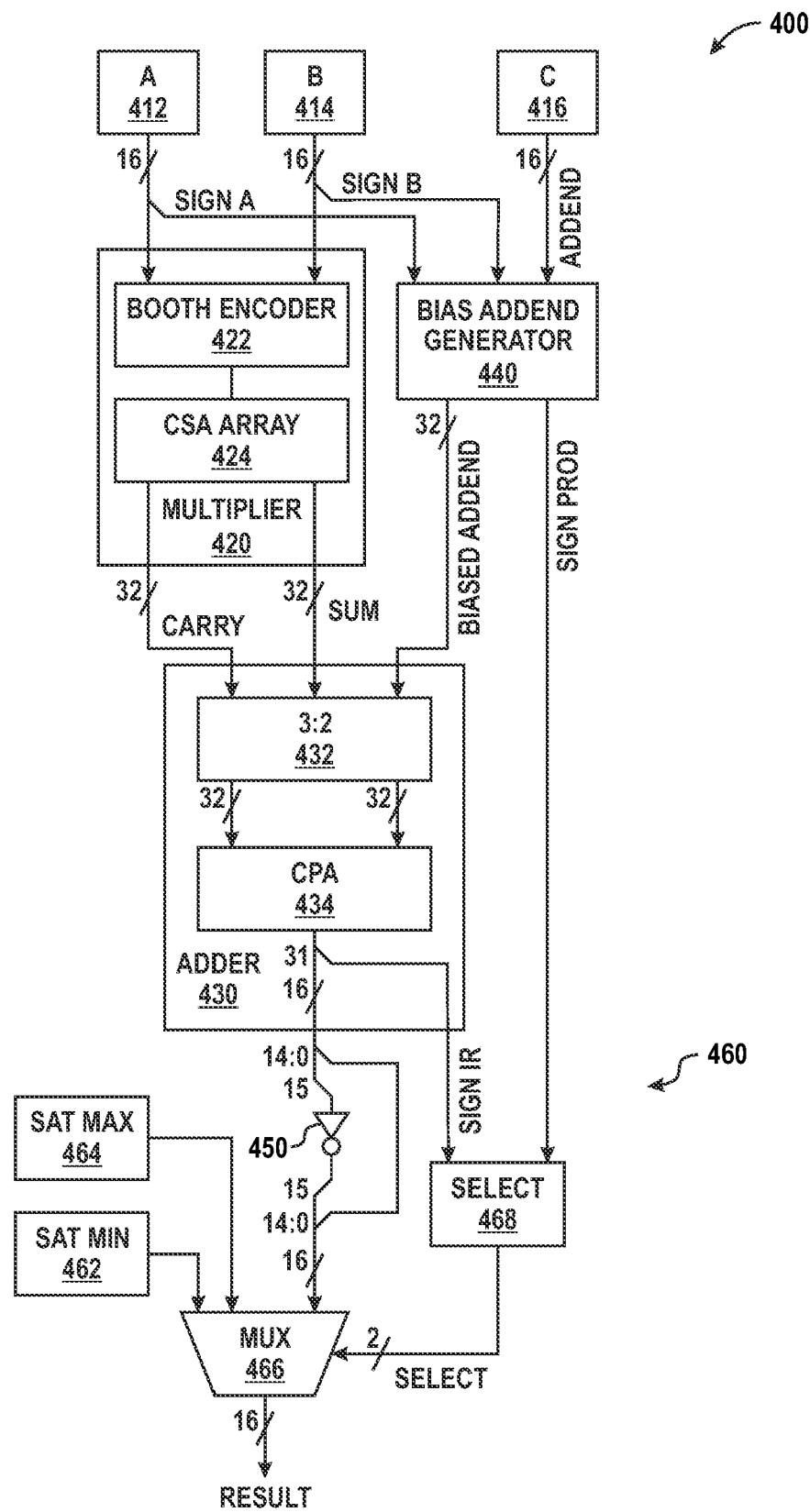
FIG. 4 is a block diagram illustrating an arithmetic processing unit operable to perform saturation arithmetic according to another embodiment of the present invention.

FIG. 4 is a block diagram illustrating an arithmetic processing unit 400 operable to perform saturation arithmetic according to one embodiment of the present invention. Arithmetic processing unit 400 can perform a multiply-add operation. Unlike arithmetic processing unit 200 of FIG. 2, arithmetic processing unit 400 combines the functions of bias generator 240 and extends logic 250 into a single module that forms a biased addend labeled "BIASED ADDEND." Arithmetic processing unit 400 includes a multiplicand operand 412 labeled "A," a multiplier operand 414 labeled "B," an addend operand 416 labeled "C," a multiplier module 420 including a Booth encoder 422 and a CSA array 424, a biased addend generator 440, an adder 430 including a 3:2 compressor 432 and a carry-propagate adder 434, and output selection circuitry 460 including a saturated minimum value 462, a saturated maximum value 464, a multiplexer 466, an inverter 450, and select logic 468.

Multiplier 420 has a first input for receiving operand 412, a second input for receiving operand 414, a first output for providing a signal labeled "CARRY," and a second output for providing a signal labeled "SUM." Biased addend generator 440 has a first input for receiving a signal labeled "SIGN A" corresponding to the sign of operand 412, a second input for receiving a signal labeled "SIGN B" corresponding to the sign of operand 414, an input for receiving addend operand 416 represented by a signal labeled "ADDEND," a first output for providing a signal labeled "BIASED ADDEND," and a second output for providing a signal labeled "SIGN PROD" corresponding to a sign of the product of operand 412 and operand 414. Adder 430 has a first input for receiving signal CARRY, a second input for receiving signal SUM, a third input for receiving signal BIASED ADDEND, a first output for providing an intermediate result labeled "IR," corresponding to the least-significant sixteen bits of a thirty-two bit intermediate result provided by CPA 434, and a second output for providing a signal labeled "SIGN IR" corresponding to a sign of the thirty-two bit intermediate result provided by CPA 434. Inverter 450 has an input for receiving bit 15 of signal IR, and an output. Multiplexer 466 has a first input for receiving saturated minimum value 462, a second input for receiving saturated maximum value 464, a third input for receiving a sixteen-bit non-saturated result, a control input for receiving a signal labeled "SELECT," and an output for providing a signal labeled "RESULT." The most-significant bit of the sixteen-bit non-saturated result is provided by inverter 450, and bits fourteen to zero of the sixteen-bit non-saturated result is provided by signal IR(14:0). Select logic 468 has a first input for receiving signal SIGN IR, a second input for receiving signal SIGN PROD, and an output for providing signal SELECT to the control input of multiplexer 466.

Each of operands 412, 414, and 416 is a sixteen-bit signed integer. Multiplier 420 receives operand 412 and operand 414, and provides a product in the form of a thirty-two bit carry value represented by signal CARRY, and a thirty-two bit sum value represented by signal SUM. Multiplier 420 uses Booth encoder 422 to provide partial products in a process known as Booth's recoding. CSA array 424 reduces these partial products to two partial products in successive CSA stages to provide signals CARRY and SUM.

Biased addend generator 440 generates a bias value and combines that bias value with addend operand 416 to provide thirty-two bit signal BIASED ADDEND. The operation of biased addend generator 440 will be further described with reference to FIG. 5 below.

Compressor 432 receives signals CARRY, SUM, and BIASED ADDEND, and provides a sum of the respective values represented by a thirty-two bit carry and a thirty-two bit sum signal to CPA 434. CPA 434 converts the carry/sum representation produced by compressor 432 into a result represented by a single thirty-two bit binary integer, and provides the least significant sixteen bits of this value to multiplexer 466 via signal IR. The value represented by signal IR is equal to the final result of the multiply-add calculation if select module 468 determines that neither an overflow nor an underflow condition has occurred.

The operation of multiplexer 466 and select module 468 is the same as described with reference to output selection circuitry 260 of FIG. 2 with additional details shown here. If select module 468 detects an overflow condition, select module 468 configures multiplexer 466 via signal SELECT to provide saturated maximum value 464 as a final result via signal RESULT. If select module 468 detects an underflow condition, select module 468 configures multiplexer 466 to provide saturated minimum value 462 as a final result via signal RESULT. If select module 468 detects neither an overflow nor an underflow condition, select module 468 configures multiplexer 466 to provide the non-saturated result as a final result.

Figure 5:
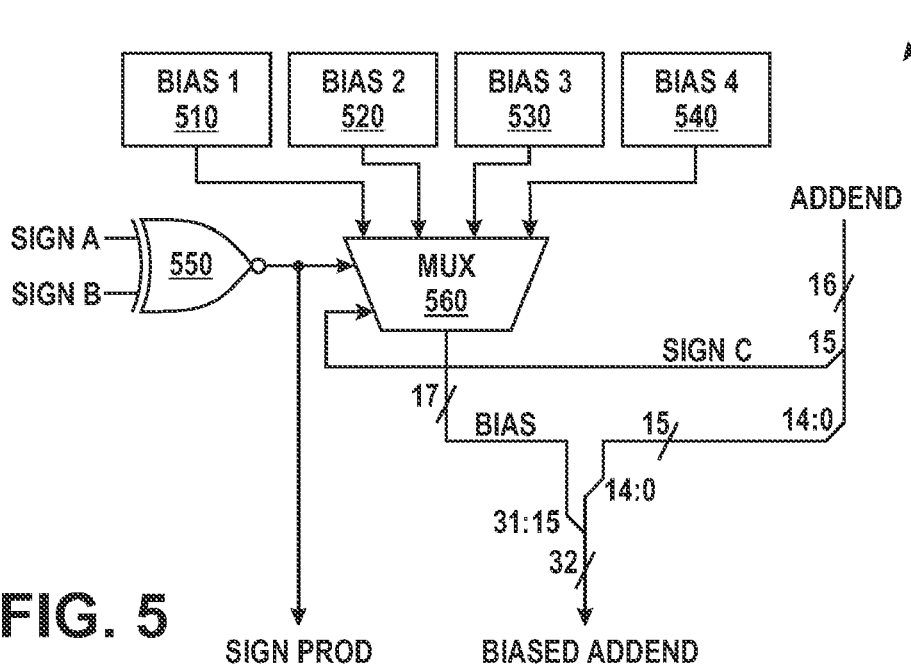
FIG. 5 is a partial schematic and partial block diagram illustrating the biased addend generator of FIG. 4.

FIG. 5 is a partial schematic and partial block diagram illustrating biased addend generator 440 of FIG. 4. Biased addend generator 440 combines the operations performed by bias generator 240 and extend logic 250 of FIG. 2 to provide a single biased addend rather than a bias value and a separate sign-extended addend. This feature allows adder 430 to calculate the sum of only three values, whereas adder 230 of FIG. 2 must calculate the sum of four values.

Biased addend generator 440 includes a first bias value 510, a second bias value 520, a third bias value 530, a fourth bias value 540, an exclusive-NOR gate 550, and a multiplexer 560. Exclusive-NOR gate 550 has a first input for receiving signal SIGN A, a second input for receiving signal SIGN B, and an output for providing signal SIGN PROD. Multiplexer 560 has a first data input for receiving bias value 510, a second data input for receiving bias value 520, a third data input for receiving bias value 530, a fourth data input for receiving bias value 540, a first control input for receiving signal SIGN PROD, a second control input for receiving a signal labeled "SIGN C" representing a sign of addend operand 416, and an output for providing signal labeled "BIAS." Signal BIAS is a seventeen bit binary value and provides the high-order seventeen-bit portion of thirty-two bit signal BIASED ADDEND. The least-significant fifteen bits of signal BIASED ADDEND are determined based on the least significant fifteen bits of signal ADDEND. The operation of biased addend generator is illustrated in the following table:

| SIGN PROD | SIGN C | BIASED ADDEND(31:0) |
|---|---|---|
| 0 | 0 | 01111111111111111::CEXT(14:0) |
| 0 | 1 | 01111111111111110::CEXT(14:0) |
| 1 | 0 | 10000000000000001::CEXT(14:0) |
| 1 | 1 | 10000000000000000::CEXT(14:0) |

Signal BIASED ADDEND is thus a concatenation of a bias value and the un-signed portion of an addend. Note that bit fifteen of signal BIASED ADDEND is the inverse of the sign of addend operand 416.

Figure 6:
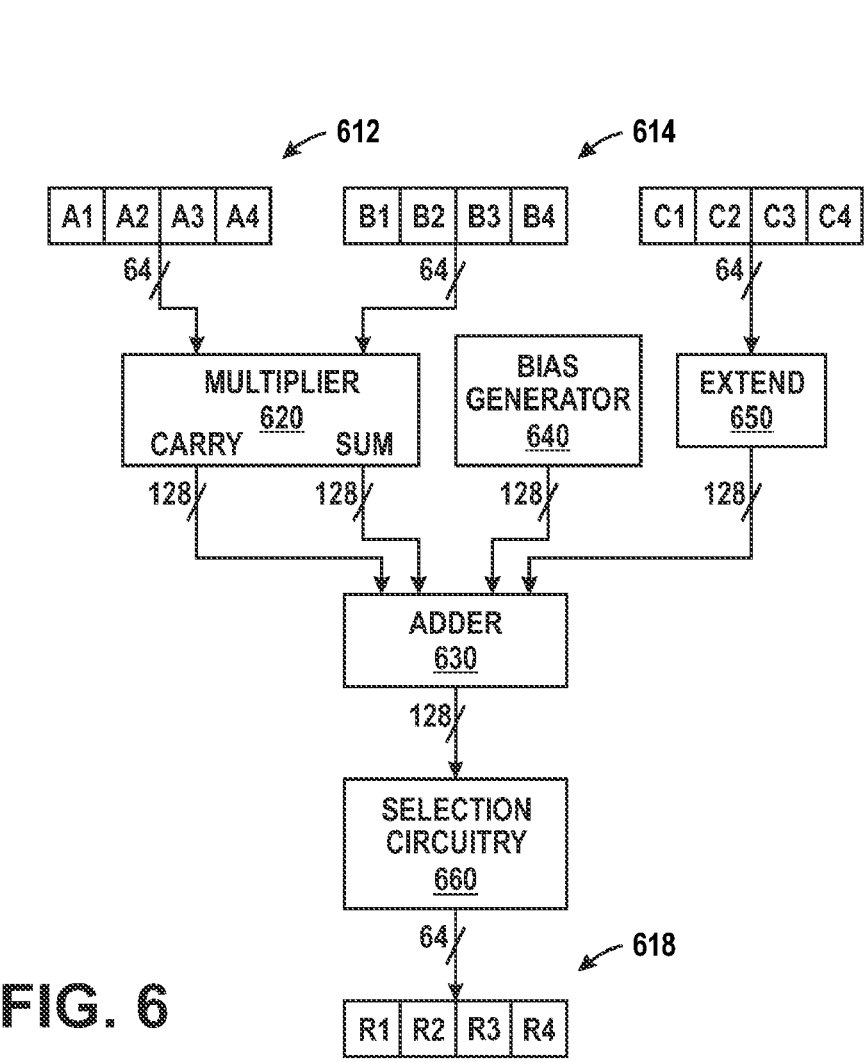
FIG. 6 is a block diagram illustrating an arithmetic processing unit operable to perform saturation arithmetic on packed operands according to yet another embodiment of the present invention.

FIG. 6 is a block diagram illustrating an arithmetic processing unit 600 operable to perform saturation arithmetic on packed operands according to yet another embodiment of the present invention. Arithmetic processing unit 600 includes multiplicand operands 612 labeled "A1, A2, A3, and A4," multiplier operands 614 labeled "B1, B2, B3, and B4," addend operands 616 labeled "C1, C2, C3, and C4," a multiplier 620, a bias generator 640, extend logic 650, an adder 630, an output selection circuitry 660, and results 618 labeled "R1, R2, R3, and R4."

The connectivity and operation of arithmetic processing unit 600 is similar to arithmetic processing unit 200 of FIG. 2, with the exception that each of operands 612, 614, and 616, and results 618, is a packed operand that each include four distinct sixteen-bit signed integers. One may also refer to the packed operands as multiple precision operands. Arithmetic processing unit 600 performs four multiply-add operations in parallel. For example, arithmetic processing unit 600 calculates result R1=(A1×B1)+C1, R2=(A2×B2)+C2, R3=(A3×B3)+C3, and R4=(A4×B4)+C4. Arithmetic processing unit 600 performs each of these individual calculations in a manner similar to that described with reference to arithmetic processing unit 200 of FIG. 2. Multiplier 620 provides a 128-bit carry signal and a 128-bit sum signal wherein each represents multiple products. Bias generator 640 provides a unique bias value corresponding to each calculation. Output selection circuitry 660 determines if each respective calculation overflows or underflows, and substitutes a maximum representable value or a minimum representable value, as appropriate.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, the techniques used herein could be used in a multiplier capable of performing only multiply operations, but not multiply-add operations. In this case, the addend input would be omitted. However, an arithmetic processing unit that is capable of performing multiply-add operations could be configured by an execution control unit to disable the addend input to perform a simple multiply operation. The disclosed techniques can be applied whenever a result of a multiply or multiply-add operation includes a fewer number of bits of information than the number of bits used to represent a corresponding intermediate product. For example, saturation may be required when the number of bits used to represent the final result is equal to the number of bits used to represent each operand, or when the number of bits used to represent the final result is equal to the number of bits used to represent an addend operand.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A multiplier-adder comprising:
  a multiplier having first and second inputs for receiving first and second operands, a first output for providing a sum signal, and a second output for providing a carry signal;
  a biased addend generator having first and second inputs for receiving sign bits of said first and second operands, a third input for receiving a third operand, a first output for providing a biased addend signal, and a second output for providing a signal representative of a sign of a product of said first and second operands, wherein said biased addend signal includes the same number of bits as said sum and carry signals;
  an adder having first and second inputs coupled to said first and second outputs of said multiplier, a third input for receiving said biased addend signal, and an output for providing a signal representative of a sum of said first, second, and third inputs;
  a multiplexer having a first input coupled to said first output of said adder, a second input for receiving a saturated minimum value, a third input for receiving a saturated maximum value, a control input, and an output for providing a multiply-add result with saturation signal; and
  select logic having a first input coupled to said second output of said bias generator and a second input for receiving a signal representative of a sign of said sum, and an output coupled to said control input of said multiplexer.

2. The multiplier-adder of claim 1, wherein said multiplier is a carry-save multiplier array characterized as using Booth's recoding.

3. The multiplier-adder of claim 1, wherein each of said first, said second, and said third operands comprises a signed integer.

4. The multiplier-adder of claim 1, wherein said biased addend generator comprises:
  a logic gate having a first input for receiving a sign bit of said first operand, a second input for receiving a sign bit of said second operand, and an output for providing a sign signal representative of said sign of said product of said first and second operands; and
  a multiplexer having a first input for receiving a first bias, a second input for receiving a second bias, a third input for receiving a third bias, a fourth input for receiving a fourth bias, a first control input coupled to said output of said logic gate, a second control input for receiving said sign of said third operand, and an output coupled to said third input of said adder for providing said biased addend signal.

5. The multiplier-adder of claim 1, wherein said first and second operands comprise packed operands, and the multiplier-adder comprises a plurality of sections for producing a like plurality of multiply-add results with saturation.

6. An arithmetic processing unit comprising:
  a multiplier for providing sum and carry signals representing a product of first and second operands;
  an adder for providing an intermediate result signal representative of a sum of said sum signal, said carry signal, and a bias signal;

a bias generator for providing said bias signal having a value determined by a sign of a product of said first and second operands, wherein said bias signal includes the same number of bits as said sum and carry signals; and output selection circuitry for selecting one of a portion of said intermediate result signal of said adder, a saturated minimum value, and a saturated maximum value in response to said sign of said product and a sign of said intermediate result.

7. The arithmetic processing unit of claim 6, wherein said adder further provides said intermediate result signal based on a sign-extended addend.

8. The arithmetic processing unit of claim 7, further comprising sign extension logic for sign-extending a third operand to provide said sign extended addend.

9. The arithmetic processing unit of claim 8, wherein each of said first, said second, and said third operands comprises a signed integer.

10. The arithmetic processing unit of claim 8, wherein said bias generator provides one of a negative bias and a positive bias as said bias signal in response to said sign of said product of said first and second operands.

11. The arithmetic processing unit of claim 6, wherein said first and second operands comprise packed operands and the arithmetic processing unit comprises a plurality of sections for producing a like plurality of results with saturation.

12. The arithmetic processing unit of claim 6, wherein said output selection circuitry further inverts a most significant bit of said portion of said intermediate result signal.

13. In a multiplier-adder circuit, a method comprising:
forming sum and carry signals representing a product of first and second operands;
forming a bias signal having a value determined by a sign of a product of said first and second operands, wherein said bias signal includes the same number of bits as said sum and carry signals;

providing a first output signal in response to an addition of said sum signal, said carry signal, a sign-extended addend, and said bias signal; and selecting, using a multiplexer of the multiplier-adder circuit, one of a portion of said first output signal, a saturated minimum value, and a saturated maximum value, as a final result in response to said sign of said product and a sign of said first output signal.

14. The method of claim 13, wherein said forming said sum and carry signals further comprises forming said sum and carry signals using a carry-save multiplier array and Booth's recoding.

15. The method of claim 13, further comprising sign extending a third operand to match a bit-size of each of said sum and carry signals.

16. The method of claim 15, wherein said forming said bias signal further comprises forming said bias signal in response to:
a sign bit of said first operand,
a sign bit of said second operand,
determining said sign of said product of said multiplication based on said first and second operands; and
selecting between a negative bias or a positive bias based on said sign of said product.

17. The method of claim 15, wherein said final result comprises the same number of binary bits as said third operand.

18. The method of claim 13, wherein said forming said sum and carry signals comprises forming packed sum and carry signals representing products of said first and second operands.

19. The method of claim 13, wherein said providing said first output signal comprises providing said first output signal as a sum of said sum signal, said carry signal, said sign-extended addend, and said bias signal and wherein said final result comprises a fewer number of binary bits than said sum.

* * * * *